L. TURNER.
WHEEL FOR VEHICLES.
APPLICATION FILED APR. 17, 1909.
937,340.
Patented Oct. 19, 1909.
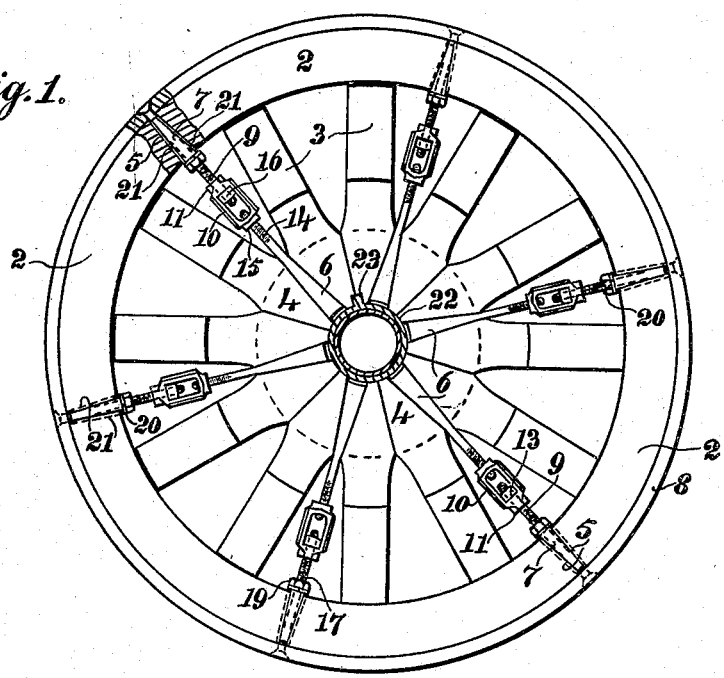
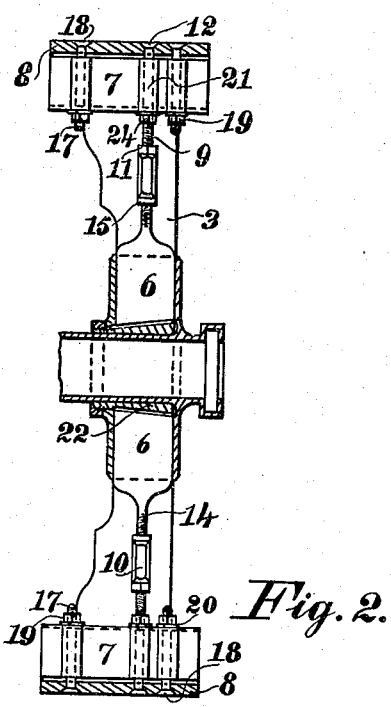
WITNESSES
INVENTOR

UNITED STATES PATENT OFFICE.

LIONEL TURNER, OF LONDON, ENGLAND.

WHEEL FOR VEHICLES.

937,340.  Specification of Letters Patent.  Patented Oct. 19, 1909.

Application filed April 17, 1909. Serial No. 490,608.

*To all whom it may concern:*

Be it known that I, LIONEL TURNER, a citizen of the United Kingdom of Great Britain and Ireland, and resident of 2 Vale Grove, Finsbury Park, London, England, have invented certain new and useful Improvements in Wheels for Vehicles, of which the following is a specification such as will enable others skilled in the art to which it appertains to make and use the same.

My invention relates to the wheels of vehicles and is particularly useful for heavy motor road vehicles and refers to that class of wheel in which movable wedges are employed for tightening up the members of the wheel, the invention consisting in improved means for tightening the spokes, said improved means being capable of use with other forms of wedging devices used between the fellies of the wheel.

According to my invention the wedges arranged between the feet of the spokes are connected by screwing devices with the rim of the wheel in such a manner that the wedges can be drawn out radially and thus tighten the spokes as desired. Several very important advantages arise from this construction among which may be mentioned the facility of tightening up the spokes without removing the wheels. The wheels can be assembled without the hubs and when so assembled placed in store ready for use to be fitted to any suitable hubs and the construction entails no complications and can be attended to without experienced labor.

In the accompanying drawings Figure 1. is a side view of a wheel constructed according to my invention, and Fig. 2. is a cross sectional view of a similar wheel.

In these drawings the tire 8 is mounted on the fellies 2 into which the spokes 3 are fitted, the feet of the said spokes having arranged between them, alternately, the wedges 6 furnished with screwed ends 14 fitted into the screwed bosses 15 of the couplings 10 which are also furnished with bosses 11 under which the nuts 16 are arranged on the faces 13 of the couplings, through which bolt 9 with nuts 24 arranged in the rim are fitted, the arrangement being such that when the couplings 10 are turned the bolts 9 and the screws 14 on the wedges 6 are drawn together or separated according to the direction of rotation.

This improved device for tightening the spokes is shown in combination with a known form of wedge 7 arranged between the fellies, the said wedge being secured by bolts 17 with countersunk heads 18 and fitted with nuts 19 and washers 20. These wedges 7 are furnished with ribs 21 which fit into the faces 5 of the fellies and assist in preventing displacement of the parts. The hub bush 22 is furnished with key piece 23.

Any suitable screwing means may be employed for drawing out the wedges 6 and it is obvious that the wedges 6 can be used without the felly wedges and in varying numbers to suit requirements.

The invention is applicable to wheels of the disk type if the disk is constructed in sections as each section would correspond to a felly section and its spoke or spokes.

What I claim and desire to secure by Letters Patent is:—

1. A wheel having wedges arranged between some of the feet of the spokes, wedges located between portions of the felly of the wheel, and screwing devices connecting a wedge at the felly to a wedge at the hub.

2. A wheel having wedges arranged between some of the feet of the spokes, and means for adjustably connecting said wedges to the rim of the wheel.

3. A wheel having wedges arranged between some of the feet of the spokes, wedges located between portions of the felly of the wheel, and means connecting the wedges at the hub with those at the felly for moving said wedges radially.

4. A wheel having wedges located between some of the feet of the spokes, and screwing devices connecting said wedges to the rim.

5. The improvements in vehicle wheels consisting in interposing wedges between the feet of the spokes and between the fellies, said wedges being connected to the tire in such wise that the wedges can be moved or thrust outward to tighten up the said elements, substantially as herein described.

In witness whereof I have hereunto set my hand in presence of two witnesses.

LIONEL TURNER.

Witnesses:
 JNO. ALDRIDGE,
 H. W. JAMESON.